April 10, 1934.  O. U. ZERK  1,954,277
CUSHIONING MEANS AND METHOD FOR MECHANICAL JOINTS
Original Filed Oct. 24, 1930
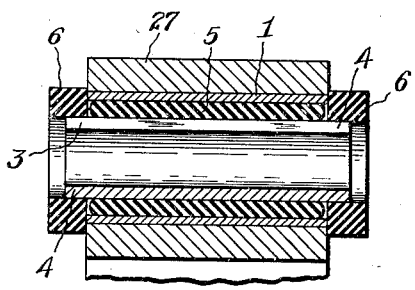
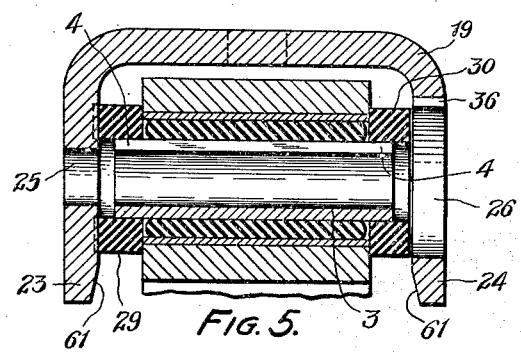
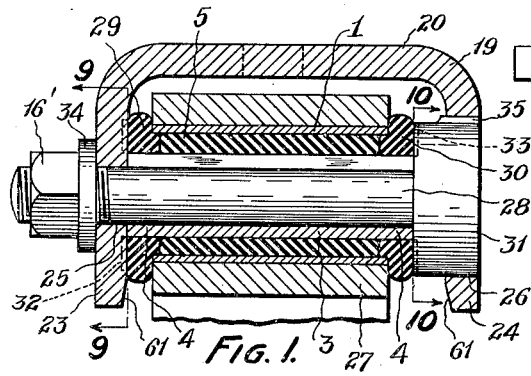
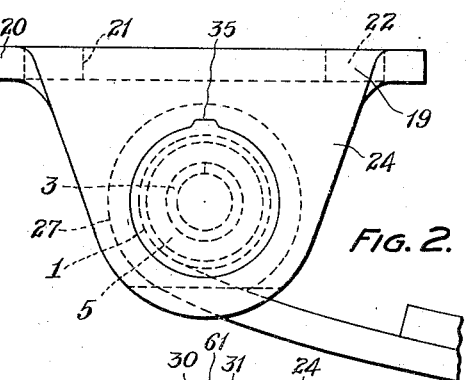
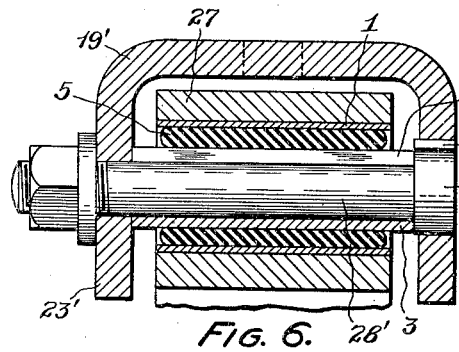
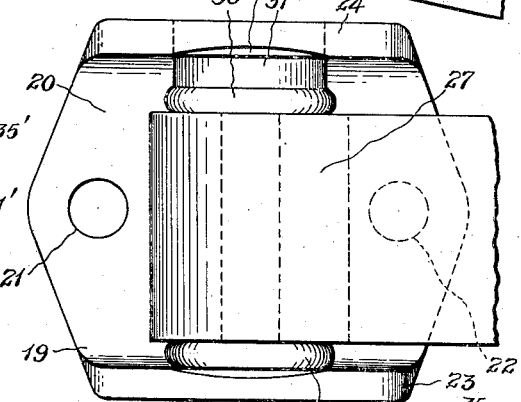
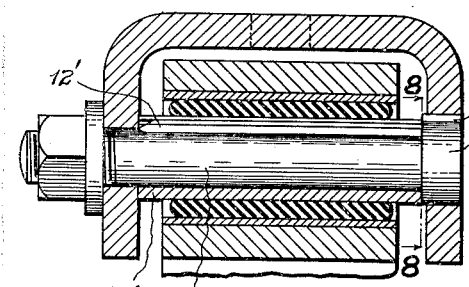
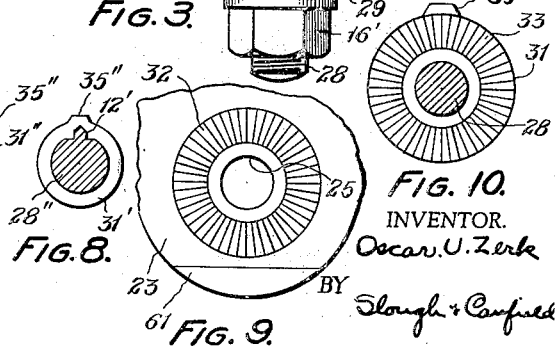
INVENTOR.
Oscar U. Zerk
BY Slough & Canfield
ATTORNEYS Patented Apr. 10, 1934

1,954,277

UNITED STATES PATENT OFFICE 1,954,277

CUSHIONING MEANS AND METHOD FOR MECHANICAL JOINTS

Oscar U. Zerk, Cleveland, Ohio

Original applications October 24, 1930, Serial No. 490,905, and February 26, 1931, Serial No. 518,369. Divided and this application November 25, 1931, Serial No. 577,310

18 Claims. (Cl. 267—54)

My invention relates to cushioning elements in general, and more particularly to the multi-tubular type of rubber bushings consisting of concentrically telescoped metal tubes, having tubes of rubber or other suitable elastic or resilient material interposed therebetween.

This general type of bushing has been well known for many years and has been used for the purpose of entirely eliminating the necessity of lubrication for the so-called swivel bearings, having movement of limited angularity such as shackle bearings, coupling bearings, and other of the various bearings used in an automobile, by inserting the rubber bushing between the inner and outer members of the bearing, and depending upon the inherent load supporting and resilient properties of the rubber interposed between the bearing members, for load supporting and cushioning functions.

The customary way of placing the above type of rubber bushing in a bearing consists of driving the assembled bushing tightly into the outer portion of a swivel bearing while the inside metal tube has to be tightly connected with the bolt or the like forming the inner member of the bearing. The present way of connecting the inside metal tube with a bolt is by using a third member such as a spring shackle to which the bolt is tightly connected and which third member is pressed against both outstanding ends of the inside metal tube.

It has been previously proposed to provide a rubber cushioning construction wherein fibre bushings, washers, or the like, are interposed between the rubber or like bushing and the inner bolt, and hanger or shackle parts, to provide for relative rotation of the inner parts of the rubber cushioning element relative to said bolt and associated parts. Such constructions are very undesirable because they do not eliminate the need for lubrication.

Two types of rubber cushioning constructions are commonly employed where rubber bushings are used. In the first type, such as in the spring shackles of an automobile, the rubber bushing is placed between two members which can be pressed longitudinally against the rubber bushing.

In the other type, the rubber bushing driven into the outer portion of the bearing is placed in a relatively stiff yoke such as the spring hanger of an automobile frame. Since in such prior constructions it is necessary that the projecting ends of the inner tube must be pressed against the yoke of the spring hanger in order to prevent the inner tube from revolving, this can be accomplished in the spring hanger yoke construction only by bending the yoke, when screw pressure is applied at the centrally located bolt.

Since this pressure has to be made great in order to bend the very stiff yoke of the spring hanger it is only natural that the workmen assembling the joint, will in many cases not apply sufficient pressure to bend the spring hanger thinking that they may break the relatively small bolt. Whenever this occurs the inside tube will not press with its projecting ends against the two sides of the yoke of the spring hanger, the inside tube will then, therefore, not be rigidly connected with either the yoke or the bolt, and the tubular rubber portion of the rubber bushing will become inoperative, with the entire rubber bushing acting substantially as a plain solid metal bushing. The inner metal tube in such a case will rotatively oscillate in bearing contact with the bolt surface, or if friction between the inner surface of the inner metal tubing and the bolt is greater than the friction between the bolt and the resultant two bearing surfaces in the yoke, the engaged surfaces of the bolt and yoke will move against each other under high pressure, and with no lubricant supplied to these moving members, they will quickly wear out, creating squeaking noises at all times.

In prior constructions multi-tubular cushioning elements have sometimes included intermediate rubber tubes either held in compressed or non-compressed condition by the inner and outer metal tubes, wherein the rubber tube is cemented to or vulcanized to the engaged surfaces of the metal tubes. My present invention in its different aspects contemplates the use either of rubber tubes held in compression, and vulcanized or not as desired, or rubber tubes not held in compression but interlocked with or cemented to the metal tubes, as by vulcanizing or the like.

An object of my invention is to provide an improved cushioning joint construction for mechanisms wherein such a joint may find an advantageous use.

Another object of my invention is to provide an improved cushioning joint to connect relatively slightly oscillatable parts of a mechanism which may be very expeditiously installed in assembled relation to the other parts of the mechanism.

Another object of my invention is to provide an improved cushioning joint to connect relatively slightly oscillatable parts of a mechanism which will be very efficient and durable in use.

Another object of my invention is to provide an improved resilient cushioning joint for mechanisms wherein accurate machining of the element of the mechanism which is disposed inwardly of my improved cushioning element, per se, and a relatively telescoped tubular part of the joint, per se, may be dispensed with.

Another object of my invention is to provide an improved resilient joint between relatively slightly oscillatory parts of mechanisms, whose first cost is low.

Another object of my invention is to provide an improved resilient joint between relatively slightly oscillatory parts of mechanisms, which may be very inexpensively assembled into the mechanisms.

Another object of my invention is to provide an improved combined resilient joint and support therefore whereby the joint is adapted to relatively interconnect a pair of relatively oscillatable parts of a mechanism.

Another object of my invention is to provide improved means to join two relatively oscillatable parts of a mechanism.

Another object of my invention is to provide an improved hanger construction including an improved bolt connector means for interconnecting the eye of a leaf spring of an automotive vehicle to the frame thereof.

Another object of my invention is to provide an improved hanger and joint means for connecting the eye of a spring of an automotive vehicel to the frame of the vehicle, whereby clamping pressure exerted upon the parts of the interconnecting means will not distort the arms of the hanger.

Other objects of my invention and the invention itself will be readily apparent to those skilled in the art to which my invention appertains, by reference to the following description of certain embodiments of my invention and which are illustrated in the accompanying drawing, of which Fig. 1 is a transverse sectional view, and Fig. 2 is a side elevational view of a spring hanger and cushioning joint mechanism for interconnecting the eye of a vehicle spring with the frame of a vehicle, and which embodies principles of my invention;

Fig. 3 is a plan view of the hanger and joint means of Figs. 1 and 2;

Figs. 4 and 5 are transverse sectional views showing graphically successive positions of the parts involved in the apparatus of Figs. 1 to 3 inclusive, during successive assembling operations preceding the final operation which causes the parts to assume the position shown in Figs. 1 to 3 inclusive;

Fig. 6 is a transverse sectional view, otherwise like that of Fig. 3 but showing a variant embodiment of my invention;

Fig. 7 is a view otherwise like that of Figs. 1 and 6, but illustrating another variant embodiment of my invention;

Fig. 8 is a section taken on the line 8—8 of Fig. 7;

Fig. 9 is a section taken on the line 9—9 of Fig. 1;

Fig. 10 is a section taken on the line 10—10 of Fig. 1;

In Fig. 9 a fragment only of the hanger per se is shown, and in Fig. 10 a view of the adjacent hanger parts is omitted.

Referring now to the embodiment of my invention illustrated in Figs. 1 to 3 inclusive, and in Figs. 9 and 10, the cushioning element per se is shown therein in combination with a preferably one-piece spring hanger 19 for an automobile spring suspension, the hanger having a preferably planular intermediate yoke portion 20, perforated at 21 and 22 for the reception of bolts or rivets securing the hanger to the frame of an automobile or the like, with a pair of substantially parallel pendant flanges 23 and 24 which are both provided with axially aligned bores 25 and 26, the latter being of greatest diameter.

The assembled parts comprising the said hanger 19, and the leaf spring eye 27, securing bolt 28 and cushioning element per se, and including the laterally disposed annular resilient spacers 29 and 30, are best shown in Figs. 1 to 3 inclusive. Referring therefore more particularly to Figs. 1 to 3 inclusive, the multi-tubular cushioning element exclusive of the resilient annular spacers 29 and 30, comprising the inner preferably seamed metal tube 3, the intermediate rubber tube 5, and the outer relatively thin shorter metal tube 1, disposed relatively telescoped in the order named, with the projecting ends in turn telescoped within the tubular eye 27 at the end of the vehicle leaf spring with preferably the end edges of the outer tube 1 disposed flush relative to the lateral edges of the spring eye, the rubber tube 5 being preferably of somewhat shorter length than the outer tube and tightly compressed between the inner and outer metal tubes named, and with the inner seamed tube 3 having ends 4 projecting beyond the end edges of the outer tube and spring eye.

When the parts are in assembled relation the bolt 28 tightly clamps between the inner side of its enlarged head 31 and the inside face of the hanger arm 23 the spring eye with its contained multi-tubular cushioning element and with the annular spacers 29 and 30 interposed between the lead 31 and the hanger arm 23 and said spring eye and multi-tubular cushioning element.

The arm 24 is not subjected to any of the clamping pressure, this being effected by the bolt 28 merely upon the cushioning element parts and spring eye and the hanger arm 23.

The surfaces of the hanger arm 23 and of the bolt head 31 which directly engage the rubber spacers 29 and 30 during the clamping, as above described, are preferably annularly serrated as shown at 32 and 33, Figs. 9 and 10, to produce a substantially positive interlock between the indentured rubber spacers and the teeth effected by the serrations.

The rubber washers prevent longitudinal movements of the tubular outer portion of the mechanism and closing of the cushioning element relative to the inner bolt and lateral arms of the shackles or hangers of the mechanism. The washers also prevent the ingress of dust and dirt to the interior parts of the cushioning element.

The inner longitudinally seamed tube 3 limits the clamping action effected by the bolt, since it is interposed between and operates to space the inner face of the bolt head 31 and the inner face of the hanger arm 23 so that the clamping action force which is effected by the bolt when the nut 16' is turned to home position is limited by the length of the inner cushioning element tube 3. Compression of the rubber spacers 29 and 30 will cause these spacers to flow, to a limited degree, radially outwardly and longitudinally inwardly of the tube 3 to effect abutting engagement between the end portions of the rubber tube 5 and inwardly projecting portions of the annular spacers.

The parts illustrated in Figs. 1 to 3 are assembled in the manner best illustrated in Figs. 4 and 5 taken in connection with Figs. 1 to 3 inclusive, the latter showing the completely assembled apparatus.

Fig. 6 illustrates the multi-tubular cushioning element per se consisting of the relatively telescoped tubes 1, 5, and 3 in assembled relation disposed within the spring eye 27 and with the annular rubber spacers 6 partially telescoped onto the outwardly projecting ends 4 of the tube 3 against the end edges of the spring eye 27 and those of the tube 1, which are flush therewith.

The next step in the assembling operation is to project the spring eye with the carried cushioning element parts as illustrated in Fig. 4, between the relatively widely spaced pendent arms 23 and 24 of the hanger 19, which can be readily accomplished without the necessity of any forcing or compressing tools because of the wide spacing of the arms 23 and 24. With the parts in the relative positions shown in Fig. 5, the bolt 28 is then projected threaded end first successively through the large opening 26 of the hanger arm 24, the annular spacer 30, the inner metal tube 3, the annular spacer 29, and the relatively small opening 25 through the hanger arm 23.

When this is accomplished the washer 34 and clamping nut 16' are turned on the threads of the bolt until the enlarged head 31 of the bolt pressing against the outer lateral surface of the spacer 30 and the inner lateral surface of the hanger arm 23 presses against the annular spacer 29, whereby both of the spacers will be compressed and reduced in thickness except that portions of the rubber will flow between the metal tubes 1 and 3 to abut or approximately abut the ends of the rubber cushioning tube 5 and rubber material will also flow readily to a restricted degree to slightly increase the outside diameter of the rubber spacers 29 and 30, as illustrated in Fig. 1.

By the structure above described and the mode of operation peculiar to the above described structure, it is possible to very readily and expeditiously assemble the various parts of the tubular cushioning element and including the laterally disposed rubber washers 29 and 30 into a rigid hanger, whether the same is formed in one piece of pressed sheet metal or a malleable iron casting, or the like.

A variation of the above described mode of operation involved in the assembly of the parts described may be readily effected because of the fact that the outside diameter of the washers 29 and/or 30 is such as to permit these washers to be readily projected into the enlarged aperture 26 of the hanger arm 24, being subsequently compressed by the inner face of the head of the bolt whereupon, being shifted to a position between said hanger arm and the cushioning element, it will expand radially to effect an increase in its outside diameter, as shown in Figs. 1 to 3 inclusive.

In prior constructions difficulty is had in assembling the parts of a resilient joint because the width of the outer and closing portion of the mechanism such as the eye of a vehicle spring, added to the thickness of the two non-compressed rubber washers are dimensionally greater than the spacing between the two arms of the U-shaped hanger, or the like.

Both at the factory, where the automotive vehicles or other apparatus are being assembled, and also at repair and service stations oftentimes the special tools, necessary to compress the two rubber washers before assembling are not available. My improved construction requires no special tools other than the tools ordinarily had in any reasonably equipped garage or service station.

With the parts in position as shown in Fig. 1, the keying projection 35 extending laterally from the enlarged bolt head 31 will be seated within the groove or notch 36 forming a part of the enlarged aperture 26 through the hanger arm 24, with the result that the bolt is non-rotatably held with respect to the hanger and this in turn assures that the tube 3 which is in ultimate assembled position is disposed with its ends tightly pressed between the bolt head 31 and the hanger arm 23, also non-rotatable relative to the hanger. I also contemplate further restricting the tendency of the inner tube 3 to rotate relative to the bolt 28 by sometimes providing the bolt 28 with a rib projection 12 interfitted within a longitudinal groove of the preferably seamed inner tube 3.

In the embodiment as illustrated in Figs. 1 to 5 inclusive, I sometimes, as a further feature of improvement, bevel the inner end edges of the hanger arms, as shown at 61, the divergent surfaces thus provided serving as guides when the cushioning elements are inserted between the arms to facilitate ready insertion of such elements therebetween.

I also contemplate interlocking the inner surface of the bolt head, and the opposing inner surface of the hanger arm 23, with the rubber washers 29 and 30, by providing these inner opposing clamping surfaces with radial serrations substantially in the manner as provided for the shackles 8 and 9, as previously described.

However, I may sometimes rely upon the frictional contact of the tube with the bolt as described, to prevent relative rotation of these parts, particularly since a seamed tube 3 may be inexpensively made having relatively thick walls as shown.

I contemplate also sometimes omitting the rubber spacers 29 and 30 as shown in Figs. 1 to 5 inclusive, and in such case, as illustrated in Figs. 6 and 7, the bolt head shown at 31' may be of relatively small size and need not be as thick as the projection 35' and serves to clamp the inner metal tube 3 of the cushioning element comprising said inner metal tube, the outer metal tube 1, and the intermediate compressed rubber tube 5, as previously described, and which is disposed within the spring eye 27, in the same manner. In such a case reliance is placed upon the rubber tube 5 to prevent lateral movements of the hanger 19' with the bolt 28' and inner metal tube 3 relative to the spring eye 27 and the relatively telescoped outer metal tube 1 rigidly fitted therein.

In both cases, however, it is to be noted that the clamping bolts exert no inwardly directed clamping pressure on the two hanger arms tending to press them inwardly, but the clamping pressure exerted by the bolts is directed solely upon two sides of the one hanger arm 23 and 23', as the case may be.

Figs. 7 and 8 illustrate the variant form of bolt and inner metal tube, wherein a longitudinally extending locking projection 12' integral with the bolt 28'' is combined in association with the keying projection 35'' extending laterally from the bolt head 31'' to prevent relative rotation of the split or at least interiorly longitudinally grooved inner metal tube 3' of the cushioning element.

In some of the following claims wherein I employ the term "bolt head", and/or "enlarged portion of a bolt", it is to be understood that I contemplate these terms to include also washers which may be employed, fitting against the bolt head and cooperating therewith in a manner analogous to a thicker bolt head per se, and the claims containing such terms are to be so construed.

Having thus described my invention applied to different embodiments and in variant forms of structures I am aware that numerous and extensive departures may be made from the said embodiments, forms, and structures, but without departing from the spirit of my invention.

The present application is a division of my co-pending application, Serial No. 518,369, filed February 26, 1931, and also my co-pending application, Serial No. 490,905, filed October 24, 1930.

I claim:

1. In a cushioning joint and support therefor comprising a hanger having an intermediate yoke portion and a pair of spaced pendent arms, a cushioning element, comprising a rubber tube, a substantially seamless metal outer tube and a longitudinally seamed inner metal tube telescoped over and within said rubber tube respectively and exerting radially directed compressive stress on the rubber tube, and a bolt in non-rotative relationship with the hanger for securing the cushioning element to the hanger, said bolt clamping said cushioning element substantially rigidly against said hanger and exerting pressure against at least one of the ends of the inner metal tube of the cushioning element without exerting deforming pressure upon the hanger arms.

2. In a cushioning joint and support therefor comprising a hanger having an intermediate yoke portion and a pair of spaced pendent arms, a cushioning element, comprising a rubber tube, a substantially seamless metal outer tube and a longitudinally seamed inner metal tube telescoped over and within said rubber tube respectively and exerting radially directed compressive stress on the rubber tube, and a bolt for securing the cushioning element to the hanger, said bolt in non-rotative relationship with the hanger clamping said cushioning element substantially rigidly against said hanger and exerting pressure against at least one of the ends of the inner metal tube of the cushioning element without exerting deforming pressure upon the hanger arms, and a vehicle spring eye telescoped over and fitted rigidly on the outer tube of the cushioning element, each of the tubes of said cushioning element being of a length less than the distance between the hanger arms, whereby said cushioning element may be readily placed between said arms for securing the cushioning element to the hanger.

3. The combination of a substantially U-shaped hanger, an element of mechanism having an opening therethrough, a cushioning element tightly fitted within said opening comprising a rubber tube, a substantially seamless metal outer tube and a longitudinally seamed inner metal tube telescoped over and within said rubber tube respectively and exerting radially directed compressive stress on the rubber tube, a pair of resilient washers each placed on a different end of the seamed tube and adjacent the end of the rubber tube, a bolt slidably mounted within one arm of the hanger and exerting clamping pressure upon the cushioning element and the other arm to compress the two resilient washers respectively between the head of the bolt and one end of said cushioning element and the said other arm and the other end of said cushioning element.

4. In combination with a pair of mechanism parts, a tubular cushioning element adapted to resiliently join the parts one of said parts having a tubular opening therethrough and within which the said cushioning element is closely fitted, said other part comprising a pair of laterally spaced arms adapted to embrace the ends of said cushioning element when it is disposed within said other part opening, said cushioning element comprising resilient annular ends, and a bolt adapted to be projected through both of the arms of the said hanger and in non-rotative relationship therewith and to clamp the said cushioning element together with its resilient ends onto one only of said arms to compress it radially and axially, said bolt restrained from lateral movements by the other said arm.

5. In combination with a pair of mechanism parts, a tubular cushioning element adapted to resiliently join the parts, one of said parts having a tubular opening therethrough and within which the said cushioning element is closely fitted, said other part comprising a pair of laterally spaced arms adapted to embrace the ends of said cushioning element when it is disposed within said other part opening, each of said arms perforated to provide concentrically aligned openings, a bolt adapted to be projected successively through said openings and maintained in non-rotative relation to the said arms, said bolt having a radially extending enlarged portion near an end, and a rubber washer adapted to be interposed between an end of said cushioning element and an inner face of the said enlarged portion of said bolt, the outside diameter of said washer being normally of such a dimension as to permit the washer being projected through an adjacent arm opening, said bolt enlargement adapted to engage and compress said washer to expand it in diameter and to decrease its thickness by lateral pressure exerted by said bolt and cushioning element.

6. In combination with a pair of mechanism parts, a tubular cushioning element adapted to resiliently join the parts, one of said parts having a tubular opening therethrough and within which the said cushioning element is closely fitted, said other part comprising a pair of laterally spaced arms adapted to embrace the ends of said cushioning element when it is disposed within said other part opening, each of said arms perforated to provide concentrically aligned openings, a bolt adapted to be projected successively through said openings and maintained in non-rotative relation to said arms, said bolt having a radially extending enlarged portion near an end, and a rubber washer adapted to be interposed between an end of said cushioning element and an inner face of the said enlarged portion of said bolt, the outside diameter of said washer being normally of such a dimension as to permit the washer being projected through an adjacent arm opening, said bolt enlargement adapted to engage and compress said washer to expand it in diameter and to decrease its thickness by lateral pressure exerted by said bolt and cushioning element, one of said mechanism parts being in the form of a U-shaped hanger, said arms being integrally formed with the intermediate yoke portion thereof.

7. In combination with a pair of mechanism parts, a tubular cushioning element adapted to resiliently join the parts, one of said parts having a tubular opening therethrough and within which the said cushioning element is closely fitted, said other part comprising a pair of laterally spaced arms adapted to embrace the ends of said cushioning element when it is disposed within said other part opening, each of said arms perforated to provide concentrically aligned openings, a bolt adapted to be projected successively through said openings, said bolt having a radially extending enlarged portion near an end, and a rubber washer adapted to be interposed between an end of said cushioning element and an inner face of the said enlarged portion of said bolt, the outside diameter of said washer being normally of such a dimension as to permit the washer being projected through an adjacent arm opening, said bolt enlargement adapted to engage and compress said washer to expand it in diameter and to decrease its thickness by lateral pressure exerted by said bolt and cushioning element, one of said mechanism parts being in the form of a U-shaped hanger, said arms being integrally formed with the intermediate yoke portion thereof, and means associated with said bolt and the hanger arm having the said enlarged opening to interlock the bolt with said arm to prevent rotation of the bolt relative to the arm, said interlocking means comprising a projection of the one received within a depression of the other.

8. In combination with a pair of mechanism parts, a tubular cushioning element adapted to resiliently join the parts, one of said parts having a tubular opening therethrough and within which the said cushioning element is closely fitted, said other part comprising a pair of laterally spaced arms adapted to embrace the ends of said cushioning element when it is disposed within said other part opening, each of said arms perforated to provide concentrically aligned openings, a bolt adapted to be projected successively through said openings, said bolt having a radially extending enlarged portion near an end, and a rubber washer adapted to be interposed between an end of said cushioning element and an inner face of the said enlarged portion of said bolt, the outside diameter of said washer being normally of such a dimension as to permit the washer being projected through an adjacent arm opening, said bolt enlargement adapted to engage and compress said washer to expand it in diameter and to decrease its thickness by lateral pressure exerted by said bolt and cushioning element, one of said mechanism parts being in the form of a U-shaped hanger, said arms being integrally formed with the intermediate yoke portion thereof, said bolt enlargement forming a head for the bolt, said head comprising a laterally extending projection, the portion of the head having the projection adapted for disposition within the said enlarged opening of said arm and extending laterally into a groove extension of said opening.

9. In a cushioning joint for relatively oscillatable mechanism parts, one of said parts comprising a pair of laterally spaced arms, a clamping bolt non-rotatively engaging at least one of said arms, the other of said parts having a tubular opening therethrough, a tubular cushioning element fitted tightly within said opening, said cushioning element comprising an intermediate rubber tube, and inner and outer metal tubes telescoped respectively within and outside of said rubber tube, said clamping bolt adapted to tightly clamp said inner tube rigidly to at least one of said arms, said inner tube having a longitudinal seam and a wall thickness which is substantially greater than the wall thickness of the outer tube.

10. In a cushioning joint for relatively oscillatable mechanism parts, one of said parts comprising a pair of laterally spaced arms, a clamping bolt non-rotatively engaging at least one of said arms, the other of said parts having a tubular opening therethrough, a tubular cushioning element fitted tightly within said opening, said cushioning element comprising an intermediate rubber tube, and inner and outer metal tubes telescoped respectively within and outside of said rubber tube, said clamping bolt adapted to tightly clamp said inner tube rigidly to one of said arms, said inner tube having a longitudinal seam and a wall thickness which is substantially greater than the wall thickness of the outer tube, said bolt making bearing contact only with the other arm.

11. In a cushioning joint for relatively oscillatable mechanism parts, one of said parts comprising a pair of laterally spaced arms, a clamping bolt non-rotatively engaging at least one of said arms, the other of said parts having a tubular opening therethrough, a tubular cushioning element fitted tightly within said opening, said cushioning element comprising an intermediate rubber tube, and inner and outer metal tubes telescoped respectively within and outside of said rubber tube, said clamping bolt adapted to tightly clamp said inner tube rigidly to one of said arms, a rubber annulus interposed between said cushioning element and the said arm to which the cushioning element is clamped whereby the clamping bolt may compress the washer and the rubber tube axially and radially.

12. In a cushioning joint for relatively oscillatable mechanism parts, one of said parts comprising a pair of laterally spaced arms, a clamping bolt non-rotatively engaging at least one of said arms, the other of said parts having a tubular opening therethrough, a tubular cushioning element fitted tightly within said opening, said cushioning element comprising an intermediate rubber tube, and inner and outer metal tubes telescoped respectively within and outside of said rubber tube, said clamping bolt adapted to tightly clamp said inner tube rigidly to one of said arms, a rubber annulus interposed between said cushioning element and the said arm to which the cushioning element is clamped, the inner surface of said last-named arm being indentured with the contacting surface of said washer.

13. In a mechanical joint connector, in combination with a hanger and the eye of a leaf spring, a bolt non-rotatively extending between the arms of the hanger and adapted to clamp the leaf spring to one of the arms of the hanger only, and cushioning means interconnecting said bolt and leaf spring eye adapted to be compressed axially and radially by said clamp bolt to permit slight oscillatory relative movements of the bolt and eye.

14. In a mechanical joint connector, in combination with a hanger and the eye of a leaf spring, a bolt non-rotatively extending between the arms of the hanger and adapted to clamp the leaf spring to one of the arms of the hanger only, and cushioning means interconnecting said bolt and leaf spring eye adapted to be compressed axially and radially by said clamp bolt to permit slight oscillatory relative movements thereof, said cushioning means comprising a rubber spacing element.

15. In a mechanical joint connector, in combination with a hanger and the eye of a leaf spring, a bolt non-rotatively extending between the arms of the hanger and adapted to clamp the leaf spring to one of the arms of the hanger only, the two ends of the bolt engaging relatively the two arms of the hanger, the bolt head being supported and guided longitudinally only by said hanger and a cushioning element compressed axially and radially by the bolt interposed between the bolt and the spring eye.

16. In a spring joint mechanism, the combination with a pair of laterally spaced supports, a bolt, and the eye of a leaf spring, of a tubular cushioning element fitted tightly within the leaf spring eye comprising a rubber tube, a substantially seamless metal outer tube and a radially expansible inner metal tube telescoped over and within said rubber tube respectively and exerting radially directed compressive stress on the rubber tube, said inner tube having substantially thicker walls than the relatively thinner outer tube, said bolt extending through the said inner tube and said supports compressing said inner tube tightly against at least one of the supports, said bolt comprising a keying projection extending into at least a portion of the seam of the inner tube, to restrain relative rotation of said tube and bolt.

17. In a spring joint mechanism, the combination with a pair of laterally spaced supports, a bolt, and the eye of a leaf spring, of a tubular cushioning element fitted tightly within the leaf spring eye comprising a rubber tube, a substantially seamless metal outer tube and a radially expansible inner metal tube, which is longer than said outer tube, telescoped over and within said rubber tube respectively and exerting radially directed compressive stress on the rubber tube, said bolt extending through the said inner tube and said supports compressing said inner tube tightly against at least one of the supports, said bolt comprising a keying projection extending into at least a portion of the seam of the inner tube, to restrain relative rotation of said tube and bolt.

18. In a spring joint mechanism, the combination with a pair of laterally spaced supports, a bolt, and the eye of a leaf spring, of a tubular cushioning element fitted tightly within the leaf spring eye comprising a rubber tube, a substantially seamless metal outer tube and a radially expansible inner metal tube telescoped over and within said rubber tube respectively, and exerting radially directed compressive stress on the rubber tube, said bolt extending through the said inner tube and said supports, and non-rotative relative to the supports and compressing said inner tube tightly against at least one of the supports, said bolt comprising a keying projection extending into the material of the inner tube to restrain relative rotation of the said tube and bolt.

OSCAR U. ZERK.